Sept. 22, 1959 W. C. GIBSON 2,905,429
WELL CASING MUD VALVE WITH FLUID AND NON-FLUID ACTUATING MEANS
Filed May 25, 1954 3 Sheets-Sheet 1
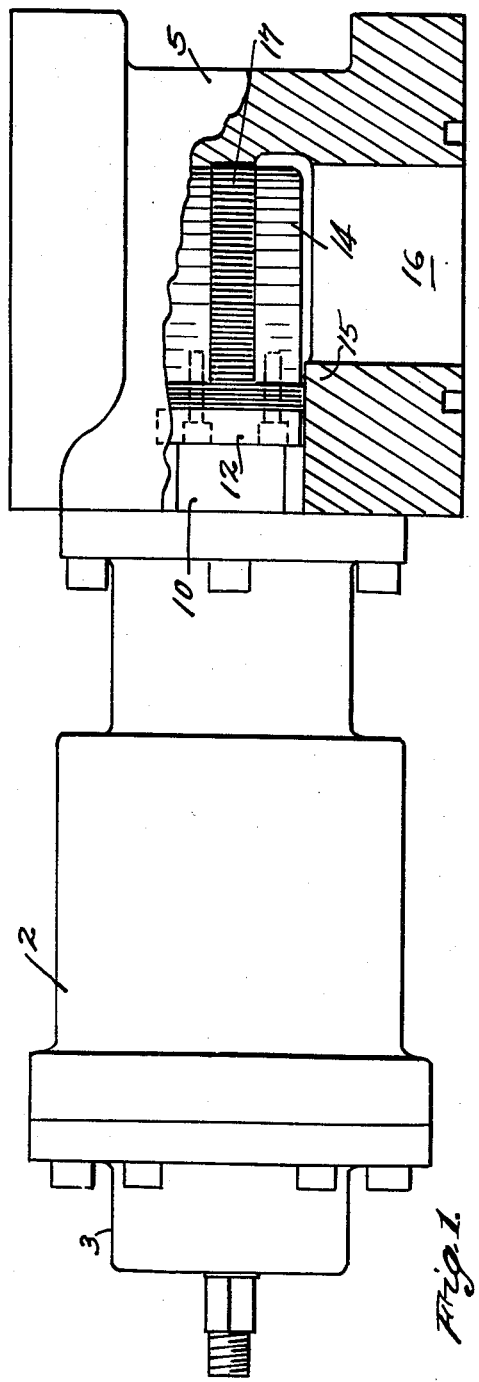
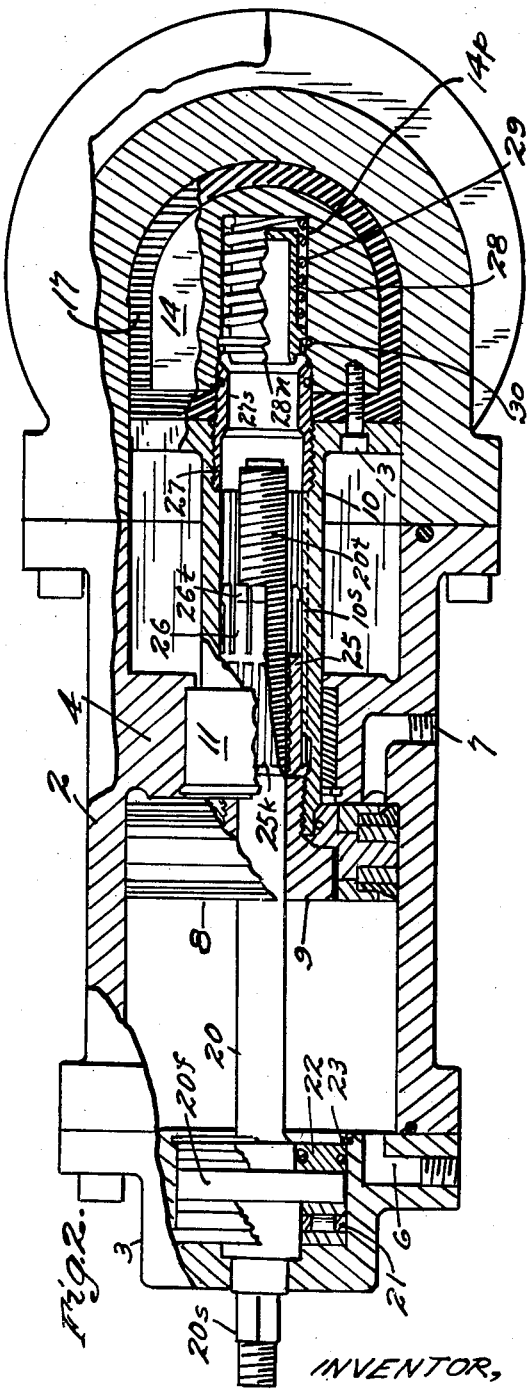
INVENTOR,
W.C. Gibson;
Frederick E. Maynard,
Attorney.

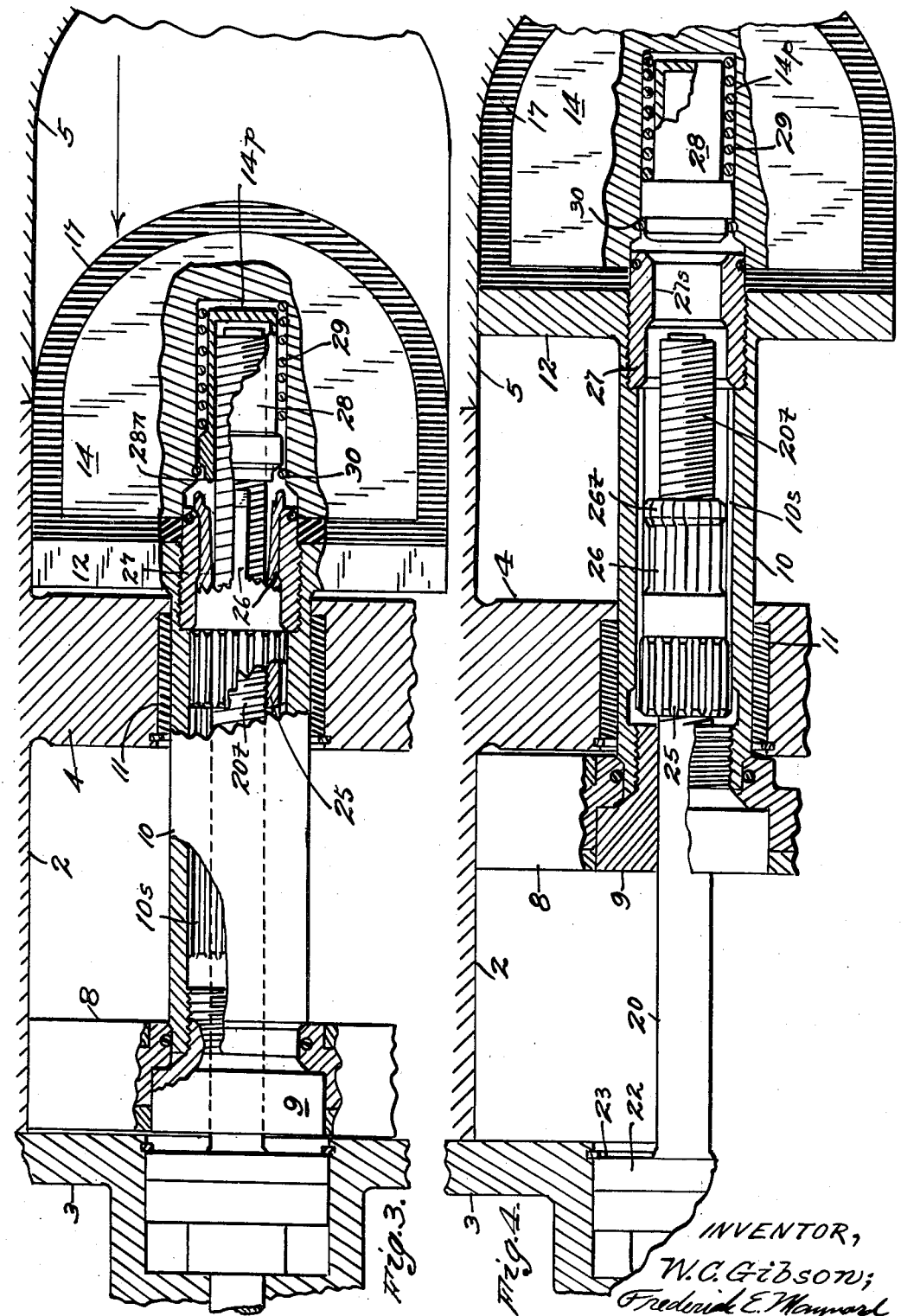

Sept. 22, 1959 W. C. GIBSON 2,905,429
WELL CASING MUD VALVE WITH FLUID AND NON-FLUID ACTUATING MEANS
Filed May 25, 1954 3 Sheets-Sheet 3
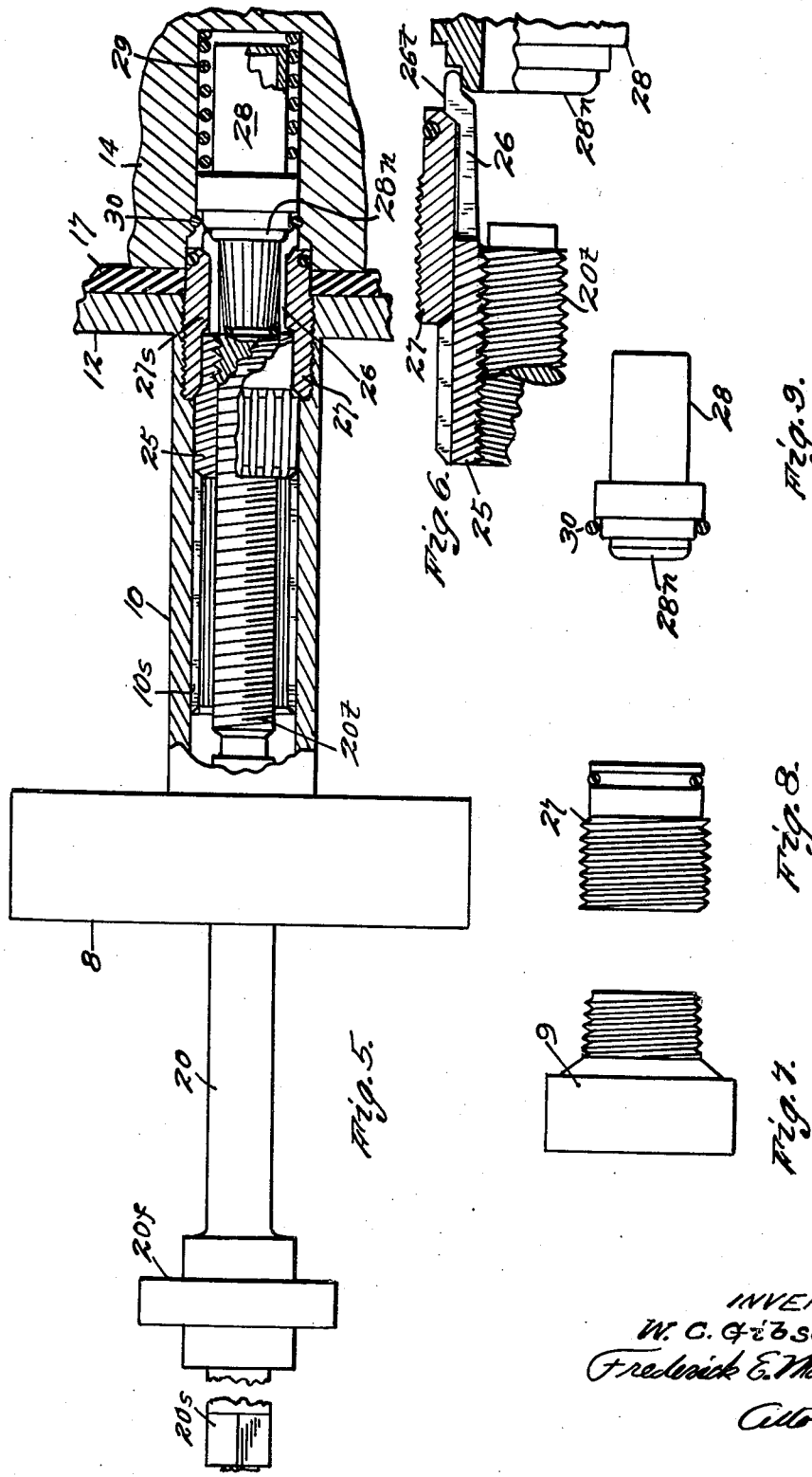
INVENTOR,
W. C. Gibson;
Frederick E. Mugnard,
Attorney.

United States Patent Office 2,905,429
Patented Sept. 22, 1959

2,905,429

WELL CASING MUD VALVE WITH FLUID AND NON-FLUID ACTUATING MEANS

Wilfred C. Gibson, Fullerton, Calif., assignor to Shaffer Tool Works, Brea, Calif., a corporation of California Application May 25, 1954, Serial No. 432,079

13 Claims. (Cl. 251—14)

In the deep well industry a heavy liquid known as "mud" is circulated during drilling operations and the instant invention is a mud valve for the control of the flow of the liquid.

Commonly such valves include a control gate either hydraulically reciprocated or mechanically reciprocated. In the case of a hydraulic failure the gate cannot be actuated and expensive delays and "trouble" operations are encountered.

A cardinal intent of the present invention is to provide a mud gate valve incorporating both a hydraulic motor for double action of the valve gate and a reserve or auxiliary mechanism which can be hand or otherwise powered at will to take over operation of the gate when the hydraulic motor is in or out of commission but releases the gate for mechanical operation.

An object of the invention is to provide a mechanical means for opening or for closing the valve gate when the hydraulic motor is incapacitated by failure or by intention; it being only necessary to release the piston of the motor from incidental back pressure.

The invention resides in certain advancements in this art as set forth in the ensuing disclosure and has, with the above, additional objects and advantages as hereinafter developed and whose constructions, combinations and sub-combinations, and detail of means, and manner of operation will be made manifest in the following description of the herewith illustrative embodiment; it being understood that modifications, variations, adaptations and equivalents may be resorted to within the scope, spirit and principles of the invention as it is claimed in conclusion hereof.

Figure 1 is a side elevation of the valve, broken away to show the closed gate edgewise in its housing. Figure 2 is a longitudinal, axial section of the casing of the valve showing the gate closed by its hydraulic motor, and unlocked from the mechanical actuator; the gate being in broken away plan view. Figure 3 is a larger scale, sectional plan showing the gate hydraulically opened, and Figure 4 is on the same scale and illustrates the hydraulically closed gate. Figure 5 is a side elevation in interlocked position with the motor piston unit for mechanical actuation of the gate, and Figure 6 is a larger scale detail of the specific locking implement. Figure 7 is a side elevation of the piston head, unit make-up collar (or nut). Figure 8 is a side elevation of the piston unit, latch keeper bushing. Figure 9 is a side elevation of the latch locking thimble.

Figs. 1 and 2, the structure embodies a substantial, heavy duty casing composed of a cylinder 2 outwardly having an end cap 3 and inwardly having a partition 4 beyond which there is affixed a housing 5 on an axis at a right angle to the cylinder.

At opposite ends of the cylinder are driving and reversing, hydraulic fluid supply ports 6 and 7 for driving a piston 8 in the cylinder. The piston has a central, make-up collar or nut 9 screwed into the adjacent end of an elongate, tubular piston rod 10 which is supported and works in and through the said partition 4 and is suitably packed at 11. The other end of the hollow rod has a widened, oblong flange 12 secured by screws 13 to a gate body 14 reciprocative between upper and lower ways 15 of the housing to open or close a flow passageway 16 therein. In the said body there is embedded an appropriate packer 17 to make an effective seal off when the gate is closed.

It will be seen that the piston, the tubular rod and the gate thus constitute a rigid unit and will be reciprocated hydraulically under control of supplied pressure fluid at the drive and reverse ports 6 and 7 of the cylinder.

The present invention is characterized by incorporation of an auxiliary, safety, positive-power means for the willful actuation of the piston-gate unit as preferred, or as the necessity may demand. Figs. 2 and 5 disclose this means as including an elongate shank 20 having a fixed flange 20f turnable against an end-thrust bearing 21 in the casing cap 3. A bearing ring 22 rests against the flange and is locked in place by a spring ring 23 to prevent end shift of the shank 20. The outer end of the shank projects through the cap and has a short stem 20s for a power wheel or crank by which to rotate the shank.

The inner portion of the power shank has an elongated, external screw thread 20t, hereinafter called the screw. The shank is rotatively supported in the piston nut collar 9 from which the screw projects to a point at about the location of the rod flange 12, Figs. 2 and 4.

There is threaded on the screw, Figs. 4 and 5, a cylindrical, travelling nut 25 which is confined against rotation by spline keys 25k sliding in splineways 10s in the bore face of the piston rod. That end of the nut 25 toward the valve gate 14 has rigid therewith an annular gang of spring fingers or latches 26 with outward tip lugs 26t. For the purpose of interlocking the spring latches 26 with the piston-gate unit there is securely mounted in the gate end of the rod 10 a screwed-in keeper bushing 27 having an internal, conical end shoulder 27s with which the tip lugs 26t of the latches will engage when the travelling nut 25 has been shifted to interlocking position, Fig. 5, by rotation of the screw 20t.

It is obvious that the travelling nut can bring the latches into effective position as to the keeper bushing at any position of the gate and its piston.

That is the intended purpose of this mechanical means for shifting the piston-gate unit, and in order to make positive the interlock of the latches in the bushing the gate body 14 has a thimble 28 coaxial with the power screw and normally thrust toward it by an expansion spring 29 in a pocket 14p of the body 14. A stop ring 30 restrains the thimble at such a position that when the latches are forced by the screw 20t against a cam nose 28n of the thimble the latches are forcibly spread to and fixed against the keeper shoulder 27s, Figs. 5 and 6. If now the gate happens to be closed, Fig. 5, lefthand rotation of the screw will draw the piston-gate unit to open position, Fig. 3, at which time the closed end of the thimble will engage the adjacent end of the non-shifting screw which will result in stripping the nose cam 28n from the latch tips and these will automatically contract and therefore release the nut latches from the keeper bushing. Hydraulic motivation can then be restored on the piston if desired.

Packers, not claimed, are shown where desired in the assembly.

What is claimed is:

1. A mud valve assembly, including: a shell having a cylinder with a piston working therein; a housing connected to the cylinder, said housing having a flow passage therein and a control gate for controlling fluid flow through said passage; a partition separating the cylinder and the housing and a tubular rod working through the partition and connecting the piston and the gate as a reciprocating unit whereby said gate is operable by said piston; means to supply pressure fluid to the piston for double action of the unit; and mechanical means operatively connected to said unit for actuation thereof without fluid pressure, said mechanical means including a power screw axially mounted in said rod and journaled at one end in the cylinder against end shift and having an external end for attachment of an actuating implement; a nut threaded on the screw and having spring latches; means splining the nut in said unit against rotation; and a keeper device in one end of said unit with which said latches are engaged by travel of said nut in one direction on the rotative screw and providing a releasable coupling between said mechanical means and said unit.

2. The assembly defined by claim 1, including: means for positively locking the latches in engagement with the keeper device.

3. The assembly defined by claim 1, including: means for positively locking the latches in engagement with the keeper device; said screw being operable to effect release of the last named means from the spring latches to permit them to disengage from the keeper device at the limit of movement of said unit in one direction.

4. The assembly defined by claim 1, including: a yieldable thimble mounted in said unit and operable to lock the latches to the keeper device, said thimble, when the unit is moved in one direction to the end of its movement, engaging the screw and being stripped from said latches to free the unit for hydraulic actuation.

5. A mud valve assembly, including: a shell having a cylinder and a piston operable therein; a housing connected to the cylinder, said housing having a flow passage therethrough and a control gate for controlling fluid flow through said passage; a partition separating the cylinder from the housing, said partition having an opening therethrough; a tubular rod operably disposed in said opening and connecting the piston and the gate as a unit for unitary movement in either direction, said unit being actuated by fluid pressure on said piston; a power screw rotatably disposed in said tubular rod and having a stem extending outwardly of the shell for engagement by means for rotating said screw, there being means holding said screw against longitudinal movement; a spring latch device threaded on the screw for axial movement in either direction by appropriate rotation of said screw, said latch device being interlockable with said unit for actuation thereof by said screw; means to retain the latch in the latched position; and means for automatically releasing the latch when the latter is moved to one extreme position.

6. In mechanism of the class described: an actuator movable in opposite directions upon application of suitable energizing force to said actuator, an actuatable member connected to said actuator and adapted to be moved thereby; means independent of said actuator for moving said member when the actuator is deenergized, said independent means including an element mounted for movement relative to said member, said element and said member including interengageable connection parts to releasably connect said independent means to said member so as to effect positive movement of said member in either direction upon corresponding movement of said element, said parts being interengageable only when said element is moved to a predetermined position relative to said member, one of said connection parts being urged toward interengaging position, and means to restrict the movement of said one connection part in response to said urging when said element is displaced from said predetermined position whereby said parts are automatically interengaged when said element is moved to said predetermined position.

7. An apparatus as recited in claim 6 including means to releasably lock said connection parts in interengagement.

8. An apparatus as recited in claim 6 including means to releasably lock said connection parts in interengagement, and means to automatically release said locking means to permit disengagement of said connection parts when said member is moved by said element to a predetermined position.

9. An apparatus as recited in claim 6 including means to releasably lock said connection parts in interengagement, said independent means including means to effect automatic release of said locking means to permit disengagement of said connection parts when said member is moved by said element to a predetermined position.

10. An apparatus as recited in claim 9 wherein said means to effect said release of said locking means comprises a power screw operable to move said element, said screw and said element extending into an opening in said actuatable member.

11. In mechanism of the class described: an actuator movable in opposite directions upon application of suitable energizing force to said actuator, an actuatable member connected to said actuator and adapted to be moved thereby; means independent of said actuator for moving said member when the actuator is deenergized, said independent means including an element mounted for movement relative to said member, said element and said member including interengageable connection parts to releasably connect said independent means to said member so as to effect positive movement of said member in either direction upon corresponding movement of said element, said parts being interengageable only when said element is moved to a predetermined position relative to said member, means automatically operative upon movement of said element to said predetermined position to urge one of said connecting parts into interengagement with the other, said one connecting part being restrained against movement toward interengaged position when said element is displaced from said predetermined position whereby said independent means may be automatically connected to said member merely by moving said independent means to said predetermined position.

12. An apparatus as recited in claim 11 wherein said independent means includes a power screw to move said element, said screw and said element extending into an opening in said actuatable member.

13. An apparatus as recited in claim 11 wherein said actuator comprises a piston and said actuatable member comprises a piston rod and a gate valve, said rod connecting said piston and valve as a working unit, said unit having an axial opening therein extending through said piston, said independent means including a power screw extending into said opening, and said element being mounted in said opening and movable by said screw.

References Cited in the file of this patent

UNITED STATES PATENTS

| 740,882 | Locke | Oct. 6, 1903 |
| 1,836,506 | Rasmussen | Dec. 15, 1931 |
| 2,154,955 | Mueller | Apr. 18, 1939 |
| 2,403,427 | Ludeman | July 2, 1946 |
| 2,644,485 | Schwender | July 8, 1953 |
| 2,704,947 | Hopkins | Mar. 29, 1955 |
| 2,712,429 | Ray | July 5, 1955 |